UNITED STATES PATENT OFFICE.

SAUL E. MELKMAN, OF MONTREAL, QUEBEC, CANADA.

PROCESS OF TREATING POTASSIUM-BEARING MINERALS.

1,148,850.  Specification of Letters Patent.  Patented Aug. 3, 1915.

No Drawing.  Application filed May 21, 1915.  Serial No. 29,599.

*To all whom it may concern:*

Be it known that I, SAUL E. MELKMAN, a subject of the King of Great Britain, residing in Montreal, county of Hochelaga, Province of Quebec, Canada, have invented a new and useful Improvement in the Process of Treating Potassium-Bearing Minerals, which invention is fully set forth in the following specification.

This invention relates to the process of treating potassium-bearing minerals, and more particularly to the treatment of potassium-bearing silicates in order to obtain therefrom compounds of potassium having a high degree of solubility in water.

In certain silicates, as, for example, feldspar, a greater or less percentage of potassium is present in combination with other elements, which, by reason of its association with these other elements of the silicate, is insoluble in water.

The object of the present invention is to convert the potassium in the insoluble silicate into water-soluble chemical compounds, to the end that the said compounds may be dissolved in water, and the potassium salts recovered by well-known methods.

With this object in view, the invention consists in subjecting the silicate, in a finely divided state when mixed with sodium chlorid and carbon, also in a finely divided state, to the action of a bath of concentrated sulfuric acid, in the presence of heat (say about 200° C.); then roasting the resulting product in a suitable furnace in the presence of air, preferably and at a temperature such that the reaction takes place without fusing the charge, as a whole, though preferably at a temperature high enough to volatilize a small portion of the potash salts, thereby insuring a temperature for the whole mass high enough to produce a maximum decomposition of the feldspar and liberation of potash.

In practice good results are secured when the temperature is in the neighborhood of from 1000 to 1150° C. After roasting, the resulting clinker or cinder is ground and subjected to the action of water, preferably heated, for the purpose of dissolving the resulting salts, and then recovering the potassium salts from the solution by any well-known method. In case the roasting has been carried on at a temperature where partial volatilization of the potash salts results, such volatilized salts may be recovered from the fumes passing from the furnace by any well-known method, such, for example, as condensing the fumes escaping from the kiln or furnace, preferably by means of a suitable stack-washer, and extracting the potash salts, in the form of potassium chlorid, with water from the condensed fumes. During the first step of the process, hydrochloric acid gas is formed in large quantities, and may be recovered in the form of hydrochloric acid, thus effecting a material economy in the practice of the invention.

The sulfuric acid acting on the sodium chlorid produces hydrochloric acid gas, and the combined action of the nascent hydrochloric acid gas and the concentrated sulfuric acid of the bath upon the silicate particles serves to initially break up the combination, and produce soluble potassium compounds. Moreover, the further resultant action of the sulfuric acid and nascent hydrochloric acid gas of the bath is to convert the silicate particles into such condition that they are more readily acted upon by the roasting of the second step of the process, thus converting a still further portion of the potassium of the silicate into soluble potassium compounds. By these means, approximately all of the potassium of the silicate may be recovered in the forms of potassium sulfate and potassium chlorid.

As a specific example of my process, I proceed as follows: Take 100 parts of powdered silicate; 50 parts of sodium chlorid; 3 to 7 parts of carbon; and 50 parts of concentrated sulfuric acid—all by weight. The potassium-bearing silicate, such, for example, as feldspar, is ground to pass through a 200-mesh sieve. This powdered silicate is then intimately mixed with the alkali chlorid, such as sodium chlorid, in a granular form, together with the reducing substance, such as crude carbon in a finely pulverized condition. This intimate mixture is then introduced into the bath of concentrated sulfuric acid, preferably from 60° to 65° Baumé strength. The whole mass is then subjected to a temperature of about 200° C., until the reactions are complete. During this step of the process, the resultant hydrochloric acid gases are preferably conducted off and recovered in the form of hydrochloric acid. After the reactions in the bath are complete, and the resulting product has been allowed to cool, it is pulverized and placed in a suitable furnace, where it is roasted in the presence of air, the temperature being raised to approximately 1000° to 1150° C., until tests show that the silicates are decomposed. The duration of the treatment of the mixed materials is about two hours, and the heating should be continued until practically complete combustion of the carbon has been effected. The result of this treatment is a porous clinker or cinder containing water-soluble potassium salts, together with sodium sulfates that have been formed in the reaction. This clinker or cinder may be ground and subjected to the action of water, preferably heated, for dissolving out the salts, after which the potash salts may be recovered by any suitable method.

By means of the process above described, I am enabled to recover on a commercial scale a larger amount of potash than has heretofore been found practicable.

The proportions of sodium chlorid and sulfuric acid to the powdered silicate above specified are given by way of example, but it will be understood by those skilled in the art that they may be varied depending on the refractory character of the potash-bearing rock subjected to their action.

What is claimed is:—

1. The process of rendering potassium salts in silicates water-soluble which consists in subjecting the silicate in powdered form together with sodium chlorid to the action of a bath of concentrated sulfuric acid in the presence of heat.

2. The process of treating potassium-bearing silicates which consists in subjecting the silicate in powdered form together with sodium chlorid and pulverized carbon to the action of a bath of concentrated sulfuric acid in the presence of heat, then pulverizing the resulting product and roasting the same at a temperature of from 1000° to 1150° C.

3. The process of treating potassium-bearing silicates to recover potassium salts therefrom which consists in intimately mixing powdered silicate, pulverized carbon, and sodium chlorid, then introducing the mixture into a bath of concentrated sulfuric acid, then heating the whole, pulverizing the resulting product, and then roasting the same at from 1000° to 1150° C.

4. The process of treating refractory potassium-containing compounds for obtaining soluble potassium salts therefrom consisting in subjecting said compounds in comminuted condition together with sodium chlorid and comminuted carbon to a bath of concentrated sulfuric acid to partially decompose said refractory compounds, and roasting the resulting product in presence of air.

5. The process of treating refractory potassium-containing compounds for obtaining soluble potassium salts therefrom consisting in subjecting said compounds in comminuted condition together with sodium chlorid and comminuted carbon to a bath of concentrated sulfuric acid while heating the same to about 200° C. to partially decompose said refractory compounds, and roasting the resulting product in presence of air.

6. The process of treating refractory potassium-containing compounds for obtaining soluble potassium salts therefrom consisting in subjecting said compounds in comminuted condition to concentrated sulfuric acid in presence of nascent hydrochloric acid gas and heat of about 200° C.

7. The process of treating refractory potassium-containing compounds for obtaining soluble potassium salts therefrom consisting in subjecting said compounds with carbon in comminuted condition to a bath of concentrated sulfuric acid in presence of nascent hydrochloric acid gas and heat of about 200° C. and then roasting the resulting product in presence of air.

8. The process of treating potassium containing feldspar for obtaining soluble potassium salts therefrom consisting in introducing the comminuted feldspar together with salt and comminuted carbon into a bath of concentrated sulfuric acid, heating the mass, then roasting the resulting product in presence of air at a temperature of from 1000° to 1150° C., and extracting the comminuted roasted product with water to remove the soluble salts.

9. The process of treating potassium containing feldspar for obtaining soluble potassium salts therefrom consisting in subjecting the comminuted feldspar together with salt and comminuted carbon to a bath of sulfuric acid, heating the mass, then roasting the resulting product in presence of air at a temperature from 1000° to 1150° C. and recovering the potassium salts with water from the products of the roasting operation.

In testimony whereof I have signed this specification in the presence of two subscribing witnesses.

SAUL E. MELKMAN.

Witnesses:
S. T. CAMERON,
W. B. KERKAM.